United States Patent
Yezerets et al.

(10) Patent No.: US 8,240,129 B2
(45) Date of Patent: Aug. 14, 2012

(54) SYSTEM AND METHOD FOR DIAGNOSING OPERATION OF A NOX ADSORBER CATALYST

(75) Inventors: Aleksey Yezerets, Columbus, IN (US); Sriram Popuri, Greenwood, IN (US); Neal W. Currier, Columbus, IN (US)

(73) Assignee: Cummins Inc., Columbus, IN (US)

( * ) Notice: Subject to any disclaimer, the term of this patent is extended or adjusted under 35 U.S.C. 154(b) by 1177 days.

(21) Appl. No.: 11/613,760

(22) Filed: Dec. 20, 2006

(65) Prior Publication Data

US 2008/0148804 A1    Jun. 26, 2008

(51) Int. Cl.
    *F01N 3/00* (2006.01)
(52) U.S. Cl. ............... 60/277; 60/274; 60/276; 60/280; 60/285; 60/297
(58) Field of Classification Search ............ 60/274, 60/276, 277, 278, 280, 285, 295, 297, 301
See application file for complete search history.

(56) References Cited

U.S. PATENT DOCUMENTS

| | | | |
|---|---|---|---|
| 5,974,788 A * | 11/1999 | Hepburn et al. | 60/274 |
| 6,301,881 B1 | 10/2001 | Kumar | |
| 6,497,092 B1 * | 12/2002 | Theis | 60/274 |
| 6,581,371 B1 | 6/2003 | Orzel et al. | |
| 6,755,013 B2 * | 6/2004 | Uchida | 60/277 |
| 6,823,843 B1 * | 11/2004 | Goralski et al. | 123/435 |
| 6,990,854 B2 | 1/2006 | van Nieuwstadt et al. | |
| 7,051,520 B2 * | 5/2006 | Nagaoka et al. | 60/297 |
| 7,054,734 B2 * | 5/2006 | Todoroki et al. | 701/105 |
| 7,100,365 B2 * | 9/2006 | Nishizawa et al. | 60/285 |
| 2004/0040282 A1 | 3/2004 | Zhu | |
| 2005/0119822 A1 | 6/2005 | Surnilla et al. | |

* cited by examiner

*Primary Examiner* — Binh Q Tran
(74) *Attorney, Agent, or Firm* — Barnes & Thornburg LLP

(57) ABSTRACT

A system and method for diagnosing operation of a NOx adsorber catalyst are disclosed. An operating temperature of the catalyst is monitored, and when it exceeds a catalyst desulfation temperature threshold that occurs when the catalyst undergoes a desulfation event, a control circuit determines an oxygen storage capacity of the catalyst as a function of at least an oxygen concentration of exhaust gas exiting the catalyst. The control circuit may further determine the oxygen storage capacity as a function of an oxygen concentration of exhaust gas entering the catalyst. The control circuit may further determine the oxygen storage capacity as a function of a mass flow rate of fresh air entering the internal combustion engine that produces the exhaust gas. The oxygen storage capacity may be mapped to catalyst aging information such as, for example, a remaining useful life of the catalyst.

24 Claims, 3 Drawing Sheets

SYSTEM AND METHOD FOR DIAGNOSING OPERATION OF A NOX ADSORBER CATALYST

FIELD OF THE INVENTION

The present invention relates generally to systems for diagnosing operation of exhaust gas aftertreatment components for internal combustion engines, and more specifically to systems and methods for diagnosing operation of a NOx adsorber catalyst.

BACKGROUND

It may sometimes be necessary to diagnose a NOx adsorber catalyst to determine the NOx reduction efficiency of the catalyst. It is desirable to determine the NOx reduction efficiency by determining the oxygen storage capacity of the NOx adsorber catalyst using conventional sensors.

SUMMARY

The present invention may comprise one or more of the features recited in the attached claims, and/or one or more of the following features and combinations thereof. A method for diagnosing operation of a NOx adsorber catalyst configured to receive exhaust gas produced by an internal combustion engine may comprise monitoring an operating temperature of the catalyst, when the operating temperature of the catalyst exceeds a catalyst desulfation temperature threshold, determining an oxygen storage capacity of the catalyst as a function of an oxygen concentration of the exhaust gas entering the catalyst and an oxygen concentration of the exhaust gas exiting the catalyst, and storing the oxygen storage capacity in a memory unit.

The method may further comprise executing the monitoring, determining and storing steps only after desulfation of the catalyst is commanded.

The method may further comprise mapping the oxygen storage capacity to information relating to aging of the catalyst. The information relating to aging may comprise information relating to a remaining useful life of the catalyst.

Monitoring an operating temperature of the catalyst may comprise monitoring a first temperature corresponding to a temperature of the exhaust gas entering the catalyst, monitoring a second temperature corresponding to a temperature of the exhaust gas exiting the catalyst, monitoring a third temperature corresponding to a temperature of the exhaust gas entering a turbocharger turbine positioned upstream of the catalyst, monitoring a fourth temperature corresponding to a temperature of the exhaust gas exiting the turbocharger turbine, monitoring an air flow corresponding to a mass flow rate of fresh air supplied to the engine by a turbocharger compressor, and estimating the operating temperature of the catalyst as function of the air flow and the first, second, third and fourth temperatures.

Monitoring an operating temperature of the catalyst may alternatively comprise monitoring a first temperature corresponding to a temperature of the exhaust gas entering the catalyst, monitoring a second temperature corresponding to a temperature of the exhaust gas exiting the catalyst, and estimating the operating temperature of the catalyst as function of the first and second temperatures.

Monitoring an operating temperature of the catalyst may alternatively comprise monitoring one of a catalyst inlet temperature corresponding to a temperature of the exhaust gas entering the catalyst and a catalyst outlet temperature corresponding to a temperature of the exhaust gas exiting the catalyst, and estimating the operating temperature of the catalyst to be the same as the one of the catalyst inlet temperature when the catalyst inlet temperature has stabilized and the catalyst outlet temperature when the catalyst outlet temperature has stabilized.

The catalyst desulfation temperature threshold may be a temperature threshold above which desulfation of the catalyst occurs.

Determining an oxygen storage capacity of the catalyst may comprise determining a first lambda signal based on the oxygen concentration of the exhaust gas entering the catalyst, determining a second lambda signal based on the oxygen concentration of the exhaust gas exiting the catalyst, and determining the oxygen concentration of the catalyst based on the first and second lambda signals. Determining the oxygen concentration of the catalyst based on the first and second lambda signals may comprise determining a first instant in time when the first lambda signal transitions from lean to rich, determining a second instant in time after the second lambda signal transitions from lean to rich following transition of the first lambda signal from lean to rich and when a rate of change of the second lambda signal is greater than a rate of change threshold, and determining the oxygen concentration as a function of the first and second instants in time, a mass flow rate of fresh air entering the engine and a target lambda value.

A method for diagnosing operation of a NOx adsorber catalyst configured to receive exhaust gas produced by an internal combustion engine may comprise monitoring an operating temperature of the catalyst, when the operating temperature of the catalyst exceeds a catalyst desulfation temperature threshold, determining an oxygen storage capacity of the catalyst as a function of an oxygen concentration of the exhaust gas exiting the catalyst, and storing the oxygen storage capacity in a memory unit.

Determining an oxygen storage capacity of the catalyst may comprise determining a lambda signal based on the oxygen concentration of the exhaust gas exiting the catalyst, determining a first instant in time when the lambda signal transitions from lean to rich, determining a second instant in time after the lambda signal transitions from lean to rich when a rate of change of the second lambda signal is greater than a rate of change threshold, and determining the oxygen concentration as a function of the first and second instants in time, a mass flow rate of fresh air entering the engine and a target lambda value.

The method may further comprise executing the monitoring, determining and storing steps only after desulfation of the catalyst is commanded. The catalyst desulfation temperature threshold may be a temperature threshold above which desulfation of the catalyst occurs.

The method may further comprise mapping the oxygen storage capacity to information relating to aging of the catalyst.

Monitoring an operating temperature of the catalyst may comprise monitoring a first temperature corresponding to a temperature of the exhaust gas entering the catalyst, monitoring a second temperature corresponding to a temperature of the exhaust gas exiting the catalyst, monitoring a third temperature corresponding to a temperature of the exhaust gas entering a turbocharger turbine positioned upstream of the catalyst, monitoring a fourth temperature corresponding to a temperature of the exhaust gas exiting the turbocharger turbine, monitoring an air flow corresponding to a mass flow rate of fresh air supplied to the engine by a turbocharger compressor, and estimating the operating temperature of the catalyst as function of the air flow and the first, second, third and fourth temperatures.

Monitoring an operating temperature of the catalyst may alternatively comprise monitoring a first temperature corresponding to a temperature of the exhaust gas entering the catalyst, monitoring a second temperature corresponding to a temperature of the exhaust gas exiting the catalyst, and estimating the operating temperature of the catalyst as function of the first and second temperatures.

Monitoring an operating temperature of the catalyst may alternatively comprise monitoring one of a catalyst inlet temperature corresponding to a temperature of the exhaust gas entering the catalyst and a catalyst outlet temperature corresponding to a temperature of the exhaust gas exiting the catalyst, and estimating the operating temperature of the catalyst to be the same as the one of the catalyst inlet temperature when the catalyst inlet temperature has stabilized and the catalyst outlet temperature when the catalyst outlet temperature has stabilized.

A system for diagnosing operation of a NOx adsorber catalyst configured to receive exhaust gas produced by an internal combustion engine may comprise means for determining an operating temperature of the catalyst, an outlet oxygen sensor fluidly coupled to an exhaust gas outlet of the catalyst and configured to produce an outlet oxygen signal corresponding to an oxygen concentration of the exhaust gas exiting the catalyst, and a control circuit including a memory having instructions stored therein that are executable by the control circuit to monitor the operating temperature of the catalyst and to determine an oxygen storage capacity of the catalyst as a function of at least the outlet oxygen signal when the operating temperature of the catalyst exceeds a desulfation temperature threshold.

The instructions executable by the control circuit may include instructions to monitor the operating temperature of the catalyst only after the control circuit has commanded desulfation of the catalyst.

The instructions executable by the control circuit may include instructions to map the oxygen storage capacity to information relating to aging of the catalyst.

The system may further comprise an inlet oxygen sensor fluidly coupled to an exhaust gas inlet of the catalyst and configured to produce an inlet oxygen signal corresponding to an oxygen concentration of the exhaust gas entering the catalyst. The instructions executable by the control circuit may include instructions to determine the oxygen storage capacity of the catalyst further as a function of the inlet oxygen signal. The system may further comprise a mass air flow sensor fluidly coupled to an intake manifold of the engine and configured to produce a mass air flow signal corresponding to a mass air flow rate of fresh air entering the intake manifold. The instructions executable by the control circuit may include instructions to determine the oxygen storage capacity of the catalyst further as a function of the mass air flow signal. The instructions executable by the control circuit may further include instructions to determine the oxygen storage capacity of the catalyst further as a function of a target lambda value.

Alternatively, the instructions executable by the control circuit may include instructions to estimate an oxygen concentration of the exhaust gas entering the catalyst as a function of a number of engine operating parameters. The instructions executable by the control circuit may further include instructions to determine the oxygen storage capacity of the catalyst further as a function of the oxygen concentration of the exhaust gas entering the catalyst. The system may further comprise a mass air flow sensor fluidly coupled to an intake manifold of the engine and configured to produce a mass air flow signal corresponding to a mass air flow rate of fresh air entering the intake manifold. The instructions executable by the control circuit may include instructions to determine the oxygen storage capacity of the catalyst further as a function of the mass air flow signal. The instructions executable by the control circuit may further include instructions to determine the oxygen storage capacity of the catalyst further as a function of a target lambda value.

Alternatively or additionally, the instructions executable by the control circuit may include instructions to convert the outlet oxygen signal to an outlet lambda signal. The instructions executable by the control circuit may further include instructions to estimate an inlet lambda signal corresponding to a lambda of the exhaust gas entering the catalyst as a function of a number of engine operating parameters. The instructions executable by the control circuit may further include instructions to determine the oxygen storage capacity of the catalyst as a function of the inlet and outlet lambda signals. The system may further comprise a mass air flow sensor fluidly coupled to an intake manifold of the engine and configured to produce a mass air flow signal corresponding to a mass air flow rate of fresh air entering the intake manifold. The instructions executable by the control circuit may include instructions to determine the oxygen storage capacity of the catalyst further as a function of the mass air flow signal. The instructions executable by the control circuit may further include instructions to determine the oxygen storage capacity of the catalyst further as a function of a target lambda value.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same.

Figure 1:
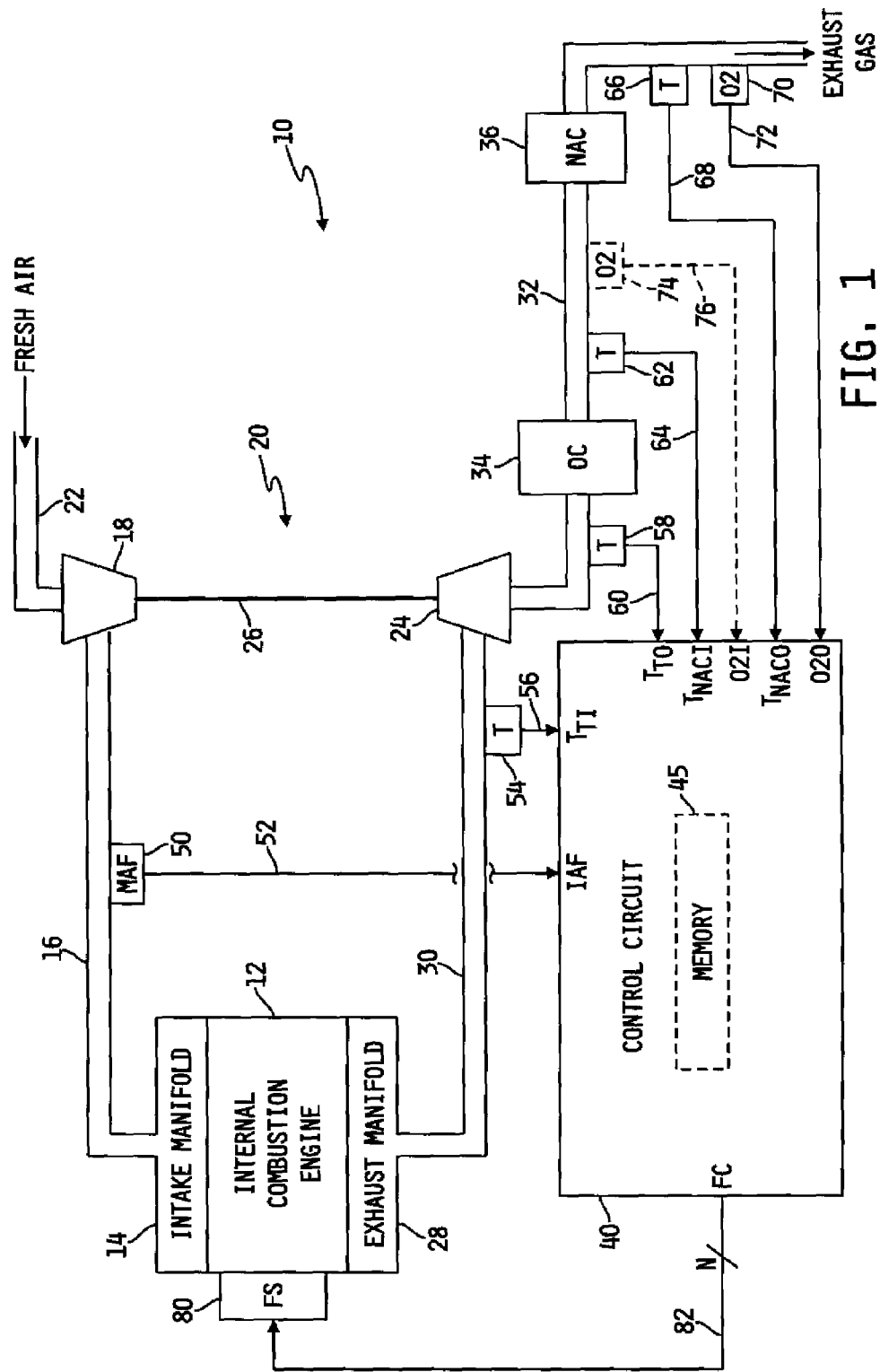
FIG. 1 is a block diagram of one illustrative embodiment of a system for diagnosing operation of a NOx adsorber catalyst for an internal combustion engine.

Referring now to FIG. 1, one illustrative embodiment of a system 10 for diagnosing operation of a NOx adsorber catalyst is shown. In the illustrated embodiment, the system 10 includes an internal combustion engine 12 having an intake manifold 14 fluidly coupled to a fresh air outlet of a compressor 18 of a turbocharger 20 via an intake air conduit 16. A fresh air inlet of the compressor 18 is fluidly coupled to a fresh air intake conduit 22. A turbine 24 of the turbocharger 20 is mechanically coupled via a rotational drive shaft 26 to the compressor 18 in a conventional manner. An exhaust gas inlet of the turbine 24 is fluidly coupled to an exhaust manifold 28 of the engine 12 via an exhaust gas conduit 30. An exhaust gas outlet of the turbine 24 is fluidly coupled to an exhaust gas conduit 32.

A conventional oxidation catalyst (OC) 34 is disposed in-line with the exhaust gas conduit 32 and includes a conventional catalyst element responsive to hydrocarbons introduced into the exhaust gas stream to elevate the temperature of the exhaust gas to a temperature suitable for regeneration of one or more downstream exhaust gas aftertreatment components. An example of one such downstream exhaust gas aftertreatment component is illustrated in FIG. 1 in the form of a conventional NOx adsorber catalyst 36.

The system 10 further includes a control circuit 40 configured to control the overall operation of the engine 12. In one embodiment, the control circuit 40 is a microprocessor-based control circuit typically referred to as an electronic or engine control module (ECM), or electronic or engine control unit (ECU). It will be understood, however, that the control circuit 40 may generally be or include one or more general purpose or application specific control circuits arranged and operable as will be described hereinafter. The control circuit 40 includes, or is coupled to, a memory unit 45 that has stored therein a number of software algorithms executable by the control circuit 40 to control various operations of the engine 12.

The control circuit 40 includes a number of inputs configured to receive sensory data corresponding to one or more operating parameters of the engine 12 and/or the exhaust gas aftertreatment system comprising the oxidation catalyst 34 and the NAC 36. For example, the system 10 includes a mass air flow sensor 50 that is positioned in fluid communication with the intake air conduit 16 as illustrated in FIG. 1, or alternatively positioned in fluid communication directly with the intake manifold 14. In either case, the mass air flow sensor 50 is electrically connected to an intake air flow input (IAF) of the control circuit 40 via a signal path 52. The mass air flow sensor 50 may be of conventional construction, and is configured to produce a signal on the signal path 52 that is indicative of the mass flow rate of fresh air being supplied by the compressor 18 of the turbocharger 20 to the intake manifold 14 of the engine 12.

The system 10 further includes a temperature sensor 54 that is positioned in fluid communication with the exhaust gas conduit 30 adjacent to the exhaust gas inlet of the turbine 24. The temperature sensor 54 is conventional, and is electrically connected to a turbine inlet temperature input, $T_{TI}$, of the control circuit 40 via a signal path 56. The temperature sensor 54 is configured to produce a signal on the signal path 56 that corresponds to the temperature of exhaust gas entering the exhaust gas inlet of the turbine 24.

The system 10 further includes a temperature sensor 58 that is positioned in fluid communication with the exhaust gas conduit 32 adjacent to the exhaust gas outlet of the turbine 24. The temperature sensor 58 is conventional, and is electrically connected to a turbine outlet temperature input, $T_{TO}$, of the control circuit 40 via a signal path 60. The temperature sensor 58 is configured to produce a signal on the signal path 60 that corresponds to the temperature of exhaust gas exiting the exhaust gas outlet of the turbine 24.

The exhaust gas aftertreatment system comprising the oxidation catalyst 34 and the NAC 36 further includes a number of sensors positioned in fluid communication with the exhaust gas conduit 32 and electrically connected to corresponding inputs of the control circuit 42. For example, a temperature sensor 62 is positioned in fluid communication with the exhaust gas conduit 32 between the OC 34 and the NAC 36, and is electrically connected to a NAC inlet temperature input, $T_{NACI}$, of the control circuit 40 via a signal path 64. The temperature sensor 62 is conventional and is configured to produce a signal on the signal path 64 that corresponds to the temperature of exhaust gas entering the NAC 36. Another temperature sensor 66 is positioned in fluid communication with the exhaust gas conduit 32 between the NAC 36 and ambient, and is electrically connected to a NAC outlet temperature input, $T_{NACO}$, Of the control circuit 40 via a signal path 68. The temperature sensor 66 is conventional and is configured to produce a signal on the signal path 68 that corresponds to the temperature of exhaust gas exiting the NAC 36.

The exhaust gas aftertreatment system comprising the OC 34 and the NAC 36 further includes a conventional oxygen sensor (also known as a lambda sensor) 70 that is disposed in fluid communication with the exhaust gas conduit 32 between the NAC 36 and ambient, and is electrically connected to an oxygen outlet input, O2O, of the control circuit 40 via a signal path 72. The oxygen sensor 70 is conventional and is configured to produce a signal on the signal path 56 corresponding to the oxygen concentration of the exhaust gas exiting the NAC 36. The exhaust gas aftertreatment system may further include another oxygen sensor 74 that is disposed in fluid communication with the exhaust gas conduit 32 between the OC 34 and the NAC 36 as shown in phantom in FIG. 1. If included in the exhaust gas aftertreatment system, the oxygen sensor 74 is electrically connected to an oxygen inlet input, O2I, of the control circuit 40 via a signal 76, and is configured to produce a signal on the signal path 76 corresponding to the oxygen concentration of the exhaust gas entering the NAC 36. In alternative embodiments, the memory unit 45 may include one or more conventional software algorithms executable by the control circuit 40 to estimate the oxygen concentration of the exhaust gas entering the NAC 36 as a function of a number of engine operating parameters, and in such embodiments the oxygen sensor 74 may be omitted.

A conventional fuel system 80 is coupled to the engine 12, and is electrically connected to the control circuit 40 via a number, N, of signal paths 82, wherein N may be any positive integer. The control circuit 40 includes conventional fueling logic which is responsive to a number of engine operating conditions to determine appropriate fueling commands in a conventional manner. The control circuit 40 provides the fueling commands (FC) to the fuel system 80 via the one or more signal paths 82 to thereby control the fuel system 80 in a conventional manner to supply fuel to the engine 12.

Figure 2:
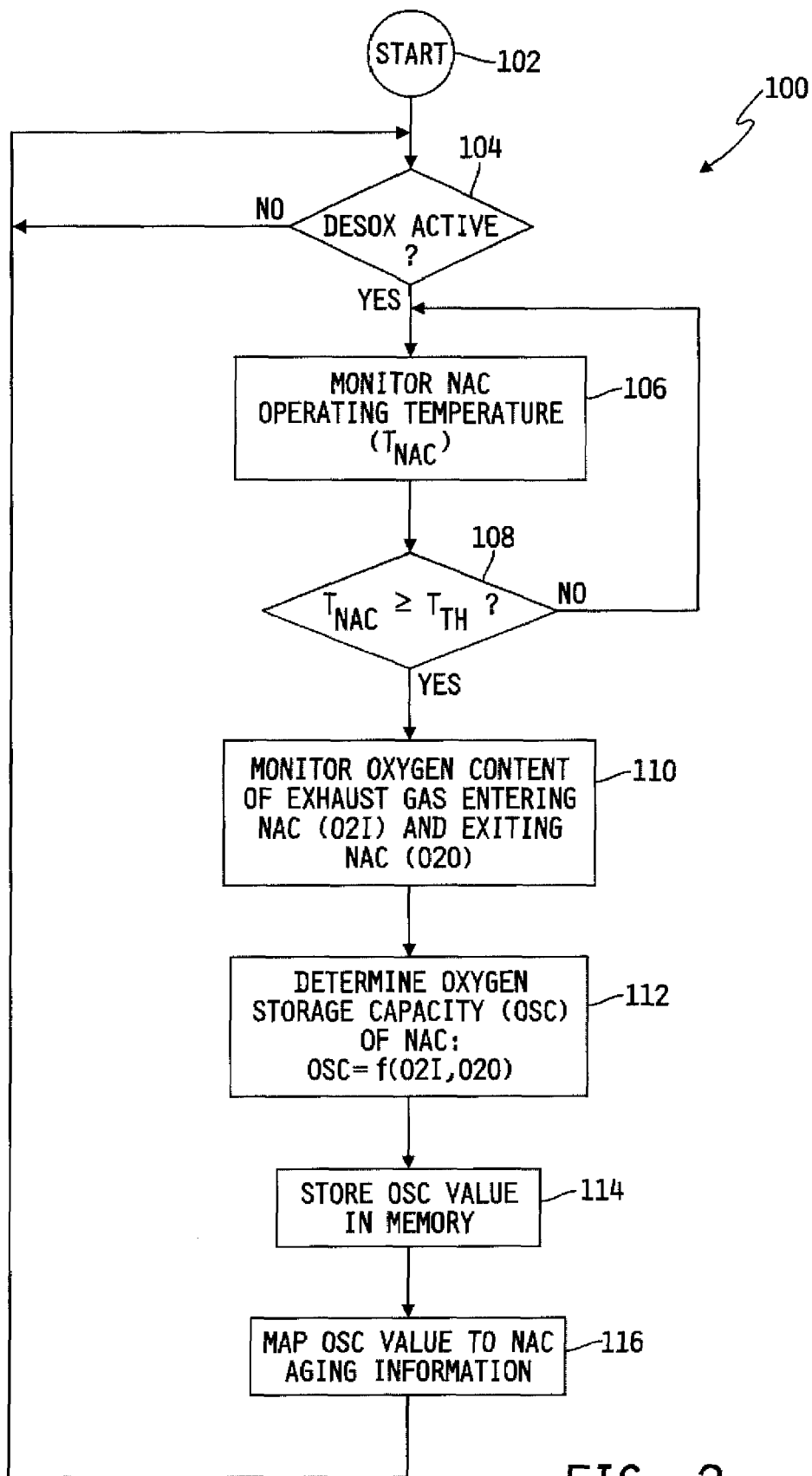
FIG. 2 is a flowchart depicting one illustrative embodiment of a software algorithm that may be executed by the system of FIG. 1 to diagnose operation of the NOx adsorber catalyst.

Referring now to FIG. 2, a flowchart of one illustrative embodiment of a software algorithm for diagnosing operation of the NOx adsorber catalyst 36 is shown. The software algorithm 100 can be stored in the memory unit 45 in the form of instructions that are executable by the control circuit 40 to produce a diagnose operation of the NOx adsorber catalyst (NAC) 36. The algorithm begins at step 102, and thereafter at step 104 the control circuit 40 is operable to determine whether desulfation (de-SOx) of the NOx adsorber catalyst 36 is active. The memory unit 45 has one or more conventional de-SOx software algorithms stored therein that are executable by the control circuit 40 to actively or controllably regenerate the NAC 36 to purge the NAC 36 of SOx (Sulfur oxides) in a known manner under specified operating conditions. In one embodiment, for example, the control circuit 40 may be operable under the direction of such one or more de-SOx software algorithms to actively or controllably regenerate the NAC 36 by controlling the fuel system 80 to introduce hydrocarbons in the form of unburned fuel into the exhaust gas produced by the engine 12 according to a conventional post-injection fueling control strategy. Sufficient hydrocarbons are introduced into the exhaust gas stream to react with the oxidation catalyst 34 so that the oxidation catalyst 34 heats the exhaust gas provided to NAC 36 to a de-SOx temperature range suitable to regenerate the NAC 36 by oxidizing the SOx trapped in the NAC 36. In one embodiment, this temperature range may be 600 degrees C.-greater than 700 degrees C., although other temperature ranges are contemplated by this disclosure.

The control circuit 40 is operable, under the direction of the one or more SOx regeneration software algorithms, to control the fuel system 80 in the manner just described to maintain the temperature of the exhaust gas provided to the NAC 36 in the SOx regeneration temperature range for a time period necessary to satisfactorily oxidize SOx collected in the NAC 36. It will be understood that active or controlled SOx regeneration of the NAC 36 should not be limited to the example process just described. Those skilled in the art will recognize other conventional structures and processes for actively or controllably conduct SOx regeneration of the NAC 36, in particular alternate structures, processes and/or hydrocarbons sources for introducing hydrocarbons into the exhaust gas supplied to the NAC 36, and any such other conventional structures, processes and/or hydrocarbon sources are contemplated by this disclosure.

In one exemplary embodiment, the control circuit 40 is operable to command desulfation of the NAC 36 periodically as a function of fuel usage by the engine 12, in a conventional manner. In this embodiment the control circuit 40 is operable to monitor fuel used by the engine 12 by monitoring the fuel commands, FC, supplied by the control circuit 40 to the fuel system 80 and/or to monitor one or more fueling signals, commands or values internal to the control circuit 40 that are ultimately used to produce the fuel commands, FC.

The control circuit 40 is generally operable to maintain a SOx regeneration value that is indicative of whether or not active SOx regeneration of the NAC 38 (deSOx) is being carried out. For example, the control circuit 40 may be operable to set the SOx regeneration value to a "1" or "true" if the NAC 36 being actively SOx regenerated, and is otherwise a "0" or "false." In this example, the control circuit 40 is operable at step 104 to determine whether active SOx regeneration of the NAC 36 is in progress by monitoring the state or status of the SOx regeneration value. It will be understood that determining whether the NAC 36 is being actively SOx regenerated should not be limited to the example just provided. Those skilled in the art will recognize other processes for determining whether the NAC 36 is being actively SOx regenerated, and any such other processes are contemplated by this disclosure.

If the control circuit 40 determines at step 104 that deSOx is not active, execution of the algorithm 100 loops back to step 104. If and when the control circuit determines at step 104 that deSOx has been commanded and is therefore active, execution of the algorithm 100 advances to step 106.

At step 106, the control circuit 40 is operable to monitor the operating temperature of the NOx adsorber catalyst 36, $T_{NAC}$, during de-SOx of the NAC 36. The present disclosure contemplates that the control circuit 40 may be operable at step 106 to determine the operating temperature, $T_{NAC}$, in any of several different ways. For example, the control circuit 40 may be operable to monitor $T_{NAC}$ at step 106 by monitoring of any one or more of a number of operating conditions of the system 10, and determining the operating temperature of the NOx adsorber catalyst 36 as a function of such one or more operating conditions. In one illustrative embodiment, for example, the memory unit 45 has stored therein one or more software algorithms that are executable by the control circuit 40 to estimate the operating temperature, $T_{NAC}$, of the NOx adsorber catalyst 36, corresponding to the NAC bed temperature, as a function of the NAC inlet temperature, $T_{NACI}$, the NAC outlet temperature, $T_{NACO}$, the turbine inlet, $T_{TI}$, the turbine outlet temperature, $T_{TO}$, and the intake air flow rate, IAF. Further details relating to estimation of the bed temperature of the NOx adsorber catalyst 36 are provided in co-pending U.S. patent application Ser. No. 11/619152, and entitled Apparatus System and Method for Determining a Catalyst Bed Temperature, the disclosure of which is incorporated herein by reference. In an alternative embodiment, for example, the memory unit 45 may have stored therein one or more software algorithms that are executable by the control circuit 40 to estimate the bed temperature of the NOx adsorber catalyst 36 as a known function of the NAC inlet temperature $T_{NACI}$, and the NAC outlet temperature, $T_{NACO}$. Further details relating to one such algorithm for estimating the bed temperature of the NOx adsorber catalyst 36 as a function of $T_{NACI}$ and $T_{NACO}$ are provided in co-pending U.S. patent application Ser. No. 11/119,721, the disclosure of which is incorporated herein by reference.

In another exemplary embodiment, the control circuit 40 may be operable to determine the operating temperature $T_{NAC}$ of the NOx adsorber catalyst 36 based only on either the NAC inlet temperature, $T_{NACI}$, or the NAC outlet temperature, $T_{NACO}$. In this embodiment, for example, the control circuit 40 may be operable to determine that the operating temperature $T_{NAC}$, is equal to either the NAC inlet temperature, $T_{NACI}$, or the NAC outlet temperature, $T_{NACO}$, when the temperature signals produced by either the temperature sensors 62 and 66 stabilizes during the de-SOx event.

In an alternative embodiment, the NOx adsorber catalyst 36 may be provided with a temperature sensor that is suitably located to produce a temperature signal that corresponds to the operating temperature of the NOx adsorber catalyst 36, and that provides such a temperature signal to the control circuit 40. Those skilled in the art will recognizer other structures and/or techniques for determining the operating temperature of the NOx adsorber catalyst 36, and any such other structures and/or techniques are contemplated by this disclosure.

The algorithm 100 advances from step 106 to step 108 where the control circuit 40 is operable to determine whether the operating temperature, $T_{NAC}$, of the NOx adsorber catalyst 36 is greater than or equal to a threshold temperature, $T_{TH}$. Generally, the threshold temperature, $T_{TH}$, will be set to a temperature that is within the typical SOx regeneration temperature range described above. If the control circuit 40 determines at step 108 that the operating temperature, $T_{NAC}$, of the NOx adsorber catalyst 36 is less than $T_{TH}$, execution of the algorithm 100 loops back to step 106. If the control circuit 40 determines at step 108 that the operating temperature, $T_{NAC}$, of the NOx adsorber catalyst is greater than or equal to $T_{TH}$, algorithm execution advances to step 110.

At step 110, the control circuit 40 is operable to monitor the oxygen concentration of the exhaust gas entering the NAC 36 (O2I) and the oxygen concentration of the exhaust gas exiting the NAC 36 (O2O). The control circuit 40 is operable to monitor the oxygen concentration, O2O, of the exhaust gas exiting the NAC 36 by monitoring the oxygen concentration signal produced by the oxygen sensor 70. In one embodiment, the control circuit 40 is operable to monitor the oxygen concentration, O2I, of the exhaust gas entering the NAC 36 by monitoring the oxygen concentration signal produced by the oxygen sensor 74. The memory unit 45 may alternatively or additionally have stored therein one or more conventional software algorithms for estimating the oxygen concentration of the exhaust gas supplied to the NAC 36. In this embodiment, the control circuit 40 may be operable to alternatively or additionally monitor the oxygen concentration of the exhaust gas supplied to the NAC 36 by executing the one or more oxygen concentration estimation algorithms stored in the memory unit 45.

Figure 3:
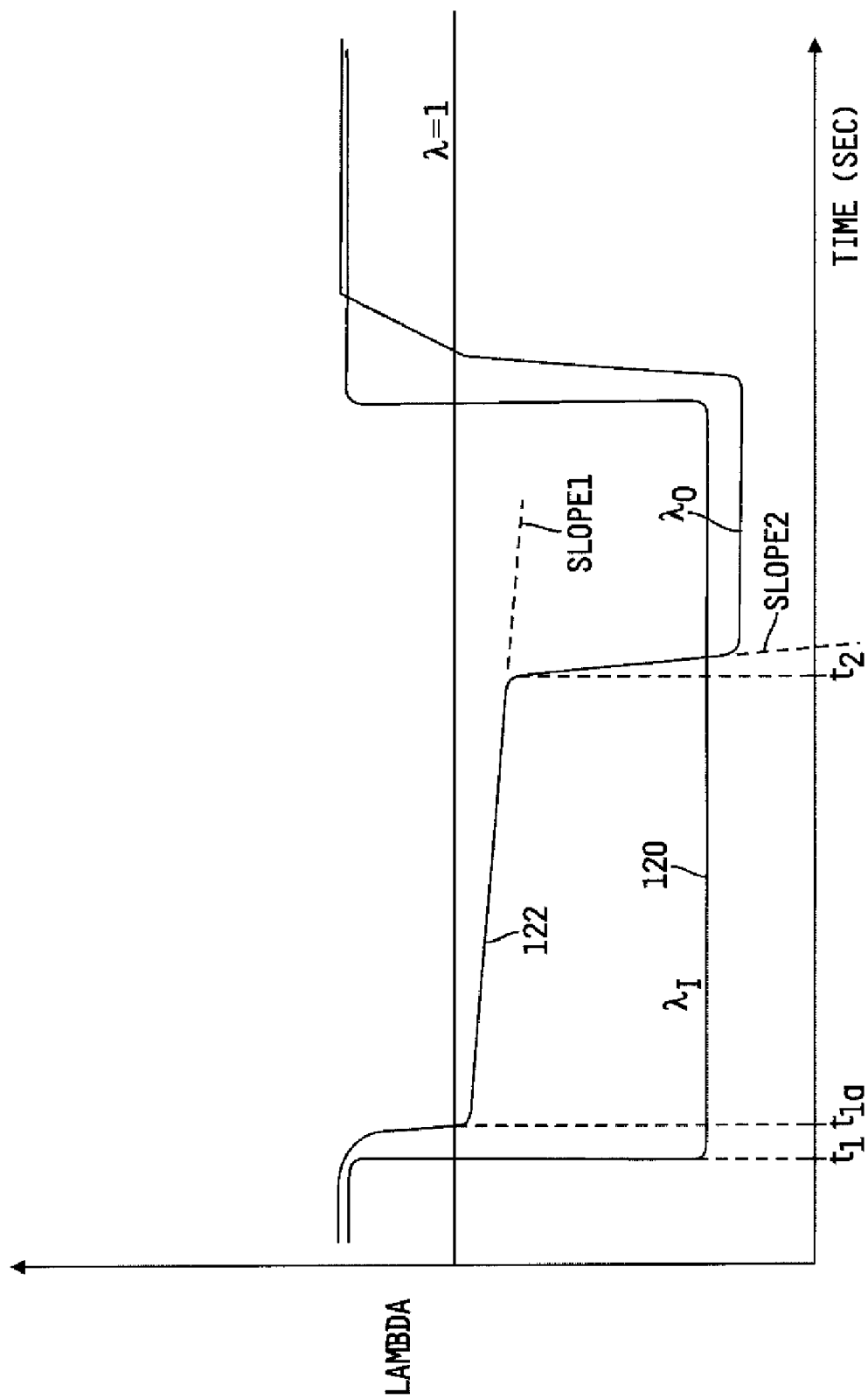
FIG. 3 is a plot of lambda vs. time illustrating example profiles of lambda entering and exiting the NOx adsorber catalyst during a conventional catalyst desulfation event.

Following step 110, the control circuit 40 is operable at step 112 to determine the oxygen storage capacity of the NAC 36 as a function of the oxygen concentration, O2I, of the exhaust gas supplied to the inlet of the NAC 36 and of the oxygen concentration, O2O, of the exhaust gas exiting the NAC 36. This disclosure contemplates various ways of determining the oxygen storage capacity of the NAC 36, and some such ways will be described with the aid of FIG. 3. FIG. 3 is a plot of lambda vs. time, wherein lambda is generally understood to correspond to the air-to-fuel ratio of the air-fuel mixture supplied to the engine 12 normalized to unity at the stoichiometric mixture. Lambda values greater than 1.0 are typically referred to as lean air-fuel mixtures, and lambda values less than 1.0 are typically referred to as rich air-fuel mixtures. In any case, the memory unit 45 includes one or more conventional algorithms that are executable by the control circuit 40 to compute lambda values from the oxygen concentration values and other engine operating parameters.

Referring to FIG. 3, the lambda, $\lambda_I$, of exhaust gas entering the exhaust gas inlet of the NAC 36 is illustrated by the example waveform 120, and the lambda, $\lambda_O$, of exhaust gas exiting the NAC 36 is illustrated by the example waveform 122. The constant value of lambda=1 is superimposed on the plot of FIG. 3 to illustrated transitions from lean-to-rich and vice versa. In the illustrated example, the NAC inlet lambda, $\lambda_I$ 120, transitions from lean to rich, i.e., crosses $\lambda$=1, at time t1. The NAC outlet lambda, $\lambda_O$ 122, thereafter transitions from lean to rich at time t1a. The NAC outlet lambda, $\lambda_O$ 122, the decreases at a slope of SLOPE1 for a time period following t1 and t1a, and at a time t2 the NAC outlet lambda, $\lambda_O$ 122, begins to decrease rapidly with a slope of SLOPE2, where SLOPE2>SLOPE1. Following time t2, both $\lambda_I$ and $\lambda_O$ transition back from rich to lean. Those skilled in the art will recognize that the inlet and outlet lambda profiles 120 and 122 represent typical fueling conditions during a de-SOx event, and that other inlet and outlet lambda profiles may alternatively be commanded during de-SOx. Any such other inlet and outlet lambda profiles are contemplated by this disclosure.

In one embodiment of step 112 of the algorithm 100 of FIG. 3, the control circuit 40 is operable to determine the oxygen storage capacity of the NAC 36 as a function of t1 and t2. In this embodiment, for example, the control circuit 40 is operable to determine t1 by monitoring O2I, computing $\lambda_I$ from O2I in a conventional manner, and determining t1 as the time at which $\lambda_I$ transitions from $\lambda$>1 to $\lambda$<1. It may be desirable to employ a detection threshold to determine t1, and in one exemplary embodiment t1 may be determined as the time at which $\lambda_I$ transitions from 1.1 to 0.9, although this disclosure contemplates other transition thresholds. In embodiments in which O2I is determined from an oxygen concentration estimation algorithm, the value of t1 may be determined in like fashion following a command to initiate de-SOx of the NAC 36. The control circuit 40 is further operable, in this example, to determine t2 by monitoring O2O, computing $\lambda_O$ from O2O in a conventional manner, and determining t2 as the time following a transition of $\lambda_O$ from lean to rich, e.g., from $\lambda$>1 to $\lambda$<1, that the slope of $\lambda_O$ becomes greater than a slope threshold. The control circuit 40 is operable to execute the determination of t2 by computing the time derivative of $\lambda_O$ following the transition of $\lambda_O$ from lean to rich, and determining t2 as the time at which the time derivative of $\lambda_O$ exceeds the slope threshold. The slope threshold will generally be a value that is between SLOPE1 and SLOPE2, and one example slope threshold value is 0.2 lambda units/sec although it will be understood that other slope threshold values are contemplated by this disclosure. The control circuit 40 may further employ a detection threshold to determine the transition of $\lambda_O$ from lean to rich.

The control circuit 40, in the above example, is operable to compute the actual oxygen storage capacity value, OSC (umol of oxygen), as a function of t1 (sec), t2 (sec), the mass flow of fresh air, IAF, supplied to the engine 12 (lb/min @ STP), and a negative oxygen concentration, NEGOX (mole fraction), in the exhaust gas supplied to the NAC 36 (i.e., cumulative concentration of the reductants in the exhaust gas) according to the equation:

$$OSC=[(t1-t2)*IAF]/[A*B*C*NEGOX] \quad (1),$$

where A, B and C are conversion factor constants; A=60 sec/min, B=0.454 g/lb and C=29 g/mol, and NEGOX is computed according to the equation:

$$NEGOX=[-21*(\lambda_T-1)]/\lambda_T \quad (2),$$

where $\lambda_T$ is a target lambda value determined by the control circuit 40.

In an alternate embodiment of step 112 of the algorithm 100 of FIG. 3, the control circuit 40 is operable to determine the oxygen storage capacity of the NAC 36 as a function of t1a and t2. In this embodiment, for example, the control circuit 40 is operable to determine t1a by monitoring O2O, computing $\lambda_O$ from O2O in a conventional manner, and determining t1a as the time at which $\lambda_O$ transitions from $\lambda$>1 to $\lambda$<1. It may be desirable to employ a detection threshold to determine t1a, and in one exemplary embodiment t1a may be determined as the time at which $\lambda_O$ transitions from 1.1 to 0.9, although this disclosure contemplates other transition thresholds. The control circuit 40 is operable in this embodiment to determine t2 as described above, and to then determine the actual oxygen storage capacity value, OSC, according to the equation:

$$OSC=[(t1a-t2)*IAF]/[A*B*C*NEGOX] \quad (3),$$

where A, B and C are conversion factor constants as in equation (1) and NEGOX is determined according to equation (2) above.

In another alternate embodiment of step 112 of the algorithm 100 of FIG. 3, information from both the above-described embodiments may be used to compute OSC. Specifically, equation (1) or (3) may be modified such that OSC is based, at least in part, on the time difference between t1 and t1a, so that the oxygen storage capacity value, OSC, may be computed according to the equation:

$$OSC=[(t1-t1a)*IAF]/[A*B*C*NEGOX] \quad (4),$$

where A, B and C are conversion factor constants as in equations (1) and (3), and NEGOX is determined according to equation (2) above.

It will be understood that the foregoing examples of determining the oxygen storage capacity of the NAC 36 should not be limiting in any way, and that this disclosure contemplates other conventional techniques for determining the oxygen storage capacity of the NAC 36. An example of one such other conventional technique involves computing the oxygen storage capacity of the NAC 36 by integrating the difference between the $\lambda_I$ and $\lambda_O$ response curves.

Referring again to FIG. 2, execution of the algorithm 100 advances from step 112 to step 114 where the control circuit 40 is operable to store the OSC value determined at step 112 in the memory unit 45. Thereafter at step 116, the control circuit 40 may be operable to map the OSC value (or stored OSC values) to NAC aging information, i.e., to information relating to the aging and/or remaining useful life of the NAC 36. Algorithm execution loops from step 116 back to step 104 to repeat the diagnostic algorithm 100.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A method for diagnosing operation of a NOx adsorber catalyst configured to receive exhaust gas produced by an internal combustion engine, the method comprising:
monitoring an operating temperature of the catalyst by monitoring a first temperature corresponding to a temperature of the exhaust gas entering the catalyst, monitoring a second temperature corresponding to a temperature of the exhaust gas exiting the catalyst, monitoring a third temperature corresponding to a temperature of the exhaust gas entering a turbocharger turbine positioned upstream of the catalyst, monitoring a fourth temperature corresponding to a temperature of the exhaust gas exiting the turbocharger turbine, monitoring an air flow corresponding to a mass flow rate of fresh air supplied to the engine by a turbocharger compressor, and estimating the operating temperature of the catalyst as function of the air flow and the first, second, third and fourth temperatures,
when the operating temperature of the catalyst exceeds a catalyst desulfation temperature threshold, determining an oxygen storage capacity of the catalyst as a function of an oxygen concentration of the exhaust gas entering the catalyst and an oxygen concentration of the exhaust gas exiting the catalyst, and
storing the oxygen storage capacity in a memory unit.

2. The method of claim 1 further comprising executing the monitoring, determining and storing steps only after desulfation of the catalyst is commanded.

3. The method of claim 1 further comprising mapping the oxygen storage capacity to information relating to aging of the catalyst.

4. The method of claim 3 wherein the information relating to aging comprises information relating to a remaining useful life of the catalyst.

5. The method of claim 1 wherein the catalyst desulfation temperature threshold is a temperature threshold above which desulfation of the catalyst occurs.

6. The method of claim 1 wherein determining an oxygen storage capacity of the catalyst comprises:
determining a first lambda signal based on the oxygen concentration of the exhaust gas entering the catalyst,
determining a second lambda signal based on the oxygen concentration of the exhaust gas exiting the catalyst, and
determining the oxygen concentration of the catalyst based on the first and second lambda signals.

7. The method of claim 6 wherein determining the oxygen concentration of the catalyst based on the first and second lambda signals comprises:
determining a first instant in time when the first lambda signal transitions from lean to rich,
determining a second instant in time after the second lambda signal transitions from lean to rich following transition of the first lambda signal from lean to rich and when a rate of change of the second lambda signal is greater than a rate of change threshold, and
determining the oxygen concentration as a function of the first and second instants in time, a mass flow rate of fresh air entering the engine and a target lambda value.

8. A method for diagnosing operation of a NOx adsorber catalyst configured to receive exhaust gas produced by an internal combustion engine, the method comprising:
monitoring an operating temperature of the catalyst by monitoring a first temperature corresponding to a temperature of the exhaust gas entering the catalyst, monitoring a second temperature corresponding to a temperature of the exhaust gas exiting the catalyst, monitoring a third temperature corresponding to a temperature of the exhaust gas entering a turbocharger turbine positioned upstream of the catalyst, monitoring a fourth temperature corresponding to a temperature of the exhaust gas exiting the turbocharger turbine, monitoring an air flow corresponding to a mass flow rate of fresh air supplied to the engine by a turbocharger compressor, and estimating the operating temperature of the catalyst as function of the air flow and the first, second, third and fourth temperatures,
when the operating temperature of the catalyst exceeds a catalyst desulfation temperature threshold, determining an oxygen storage capacity of the catalyst as a function of an oxygen concentration of the exhaust gas exiting the catalyst, and
storing the oxygen storage capacity in a memory unit.

9. The method of claim 8 wherein determining an oxygen storage capacity of the catalyst comprises:
determining a lambda signal based on the oxygen concentration of the exhaust gas exiting the catalyst, p1 determining a first instant in time when the lambda signal transitions from lean to rich,
determining a second instant in time after the lambda signal transitions from lean to rich when a rate of change of the second lambda signal is greater than a rate of change threshold, and
determining the oxygen concentration as a function of the first and second instants in time, a mass flow rate of fresh air entering the engine and a target lambda value.

10. The method of claim 8 further comprising executing the monitoring, determining and storing steps only after desulfation of the catalyst is commanded.

11. The method of claim 10 wherein the catalyst desulfation temperature threshold is a temperature threshold above which desulfation of the catalyst occurs.

12. The method of claim 8 further comprising mapping the oxygen storage capacity to information relating to aging of the catalyst.

13. A system for diagnosing operation of a NOx adsorber catalyst configured to receive exhaust gas produced by an internal combustion engine, the system comprising:
means for determining an operating temperature of the catalyst by monitoring a first temperature corresponding to a temperature of the exhaust gas entering the catalyst, monitoring a second temperature corresponding to a temperature of the exhaust gas exiting the catalyst, monitoring a third temperature corresponding to a temperature of the exhaust gas entering a turbocharger turbine positioned upstream of the catalyst, monitoring a fourth temperature corresponding to a temperature of the exhaust gas exiting the turbocharger turbine, monitoring an air flow corresponding to a mass flow rate of fresh air supplied to the engine by a turbocharger compressor, and estimating the operating temperature of the catalyst as function of the air flow and the first, second, third and fourth temperatures, an outlet oxygen sensor fluidly coupled to an exhaust gas outlet of the catalyst and configured to produce an outlet oxygen signal corresponding to an oxygen concentration of the exhaust gas exiting the catalyst, and a control circuit including a memory having instructions stored therein that are executable by the control circuit to monitor the operating temperature of the catalyst and to determine an oxygen storage capacity of the catalyst as a function of at least the outlet oxygen signal when the operating temperature of the catalyst exceeds a desulfation temperature threshold.

14. The system of claim 13 wherein the instructions executable by the control circuit include instructions to monitor the operating temperature of the catalyst only after the control circuit has commanded desulfation of the catalyst.

15. The system of claim 13 wherein the instructions executable by the control circuit include instructions to map the oxygen storage capacity to information relating to aging of the catalyst.

16. The system of claim 13 further comprising an inlet oxygen sensor fluidly coupled to an exhaust gas inlet of the catalyst and configured to produce an inlet oxygen signal corresponding to an oxygen concentration of the exhaust gas entering the catalyst, and wherein the instructions executable by the control circuit include instructions to determine the oxygen storage capacity of the catalyst further as a function of the inlet oxygen signal.

17. The system of claim 16 further comprising a mass air flow sensor fluidly coupled to an intake manifold of the engine and configured to produce a mass air flow signal corresponding to a mass air flow rate of fresh air entering the intake manifold, and wherein the instructions executable by the control circuit include instructions to determine the oxygen storage capacity of the catalyst further as a function of the mass air flow signal.

18. The system of claim 17 wherein the instructions executable by the control circuit include instructions to determine the oxygen storage capacity of the catalyst further as a function of a target lambda value.

19. The system of claim 13 wherein the instructions executable by the control circuit include instructions to estimate an oxygen concentration of the exhaust gas entering the catalyst as a function of a number of engine operating parameters, and wherein the instructions executable by the control circuit include instructions to determine the oxygen storage capacity of the catalyst further as a function of the oxygen concentration of the exhaust gas entering the catalyst.

20. The system of claim 19 further comprising a mass air flow sensor fluidly coupled to an intake manifold of the engine and configured to produce a mass air flow signal corresponding to a mass air flow rate of fresh air entering the intake manifold, and wherein the instructions executable by the control circuit include instructions to determine the oxygen storage capacity of the catalyst further as a function of the mass air flow signal.

21. The system of claim 20 wherein the instructions executable by the control circuit include instructions to determine the oxygen storage capacity of the catalyst further as a function of a target lambda value.

22. The system of claim 13 wherein the instructions executable by the control circuit include instructions to convert the outlet oxygen signal to an outlet lambda signal, and wherein the instructions executable by the control circuit include instructions to estimate an inlet lambda signal corresponding to a lambda of the exhaust gas entering the catalyst as a function of a number of engine operating parameters, and wherein the instructions executable by the control circuit include instructions to determine the oxygen storage capacity of the catalyst as a function of the inlet and outlet lambda signals.

23. The system of claim 22 further comprising a mass air flow sensor fluidly coupled to an intake manifold of the engine and configured to produce a mass air flow signal corresponding to a mass air flow rate of fresh air entering the intake manifold, and wherein the instructions executable by the control circuit include instructions to determine the oxygen storage capacity of the catalyst further as a function of the mass air flow signal.

24. The system of claim 23 wherein the instructions executable by the control circuit include instructions to determine the oxygen storage capacity of the catalyst further as a function of a target lambda value.

* * * * *